United States Patent Office 3,461,351
Patented Aug. 12, 1969

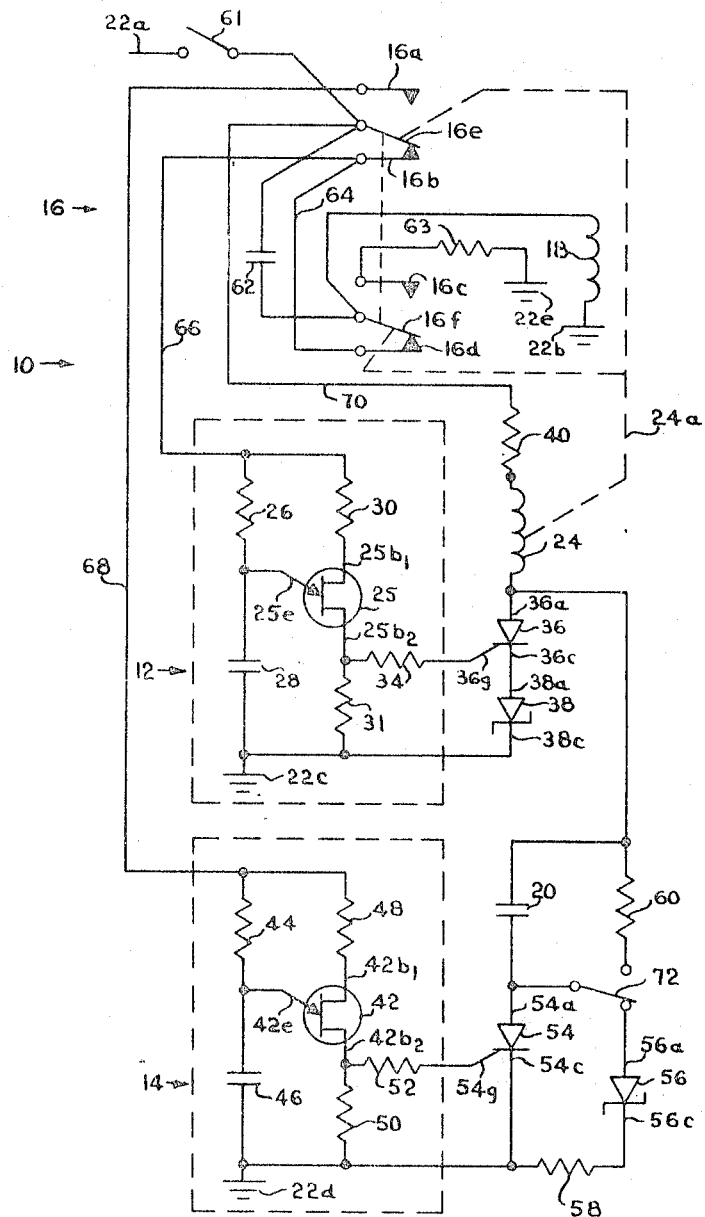
DONALD B. HEASLIP
FLORIAN E. TEPOLT
INVENTORS

3,461,351
CYCLING TIMER
Donald B. Heaslip, Sauquoit, and Florian E. Tepolt, Utica, N.Y., assignors to The Bendix Corporation, a corporation of Delaware
Filed July 18, 1966, Ser. No. 566,047
Int. Cl. H01h 47/18
U.S. Cl. 317—142                                14 Claims

ABSTRACT OF THE DISCLOSURE

A cycling timer for controlling the energization of a device having a plurality of states, each with a predetermined time duration. A pair of timing networks are disclosed in each of which conduction of an SCR is controlled by a unijunction transistor and the anodes of each SCR are coupled by a capacitor. The capacitor is charged through a switch controlling load while the first network is "off" and when the first unijunction transistor begins to conduct, current flow through the load causes the switch to energize the second network. The first and second networks are free-running oscillators and the capacitor discharges through the first SCR and a series diode to ground during the time when the second SCR is conducting.

---

The present invention relates to a cycling timer, and, more particularly, to a cycling timer for controlling the energization of a controlled device having a plurality of states with a predetermined time duration for each.

One use for the present invention is a timer for a de-icer mechanism for aircraft. In such an application a known "on" and a known "off" time which are exceedingly accurate are important. The cycling timer in such an application controls the sequence, energization time, and rest time of a valve which controls the inflation and deflation of de-icer bags on an aircraft. Such a use is merely illustrative of the scope of utility of the present invention.

When used as a cycling timer for aircraft, factors of size, weight, accuracy, repeatability, temperature stability and operability in any physical orientation or altitude are important. In particular, it is highly desirable to provide a cycling timer which is adapted to provide accurate extended time periods of operation without requiring large, heavy and expensive energy storage elements. It is also highly desirable that the timer be capable of providing extremely accurate short periods of operation which may follow the extended time periods. It is further highly desirable that the timer be a cycling timer which is capable of continuous repetition of a predetermined control program.

Accordingly, it is an object of the present invention to provide a novel cycling timer which can produce very accurate extended time periods for control apparatus without the need for large and expensive energy storage elements.

It is an object of the present invention to provide a novel cycling timer which can produce a highly accurate short time period for control apparatus immediately following an accurate extended time period for the control apparatus.

It is an object of the present invention to provide a novel timing device which is "free running" on a predetermined multi-state program.

It is an object of the present invention to provide a simple, inexpensive novel cycling timer which can generate two time periods or states for a controlled apparatus which can have a ratio exceeding 200, and with an accuracy in the time domain of $\frac{1}{10}$ percent.

It is an object of the present invention to provide a novel cycling timer employing a plurality of unijunction transistor and silicon controlled rectifier timing and switching circuits, and a simple energy storage element such as a capacitor which can achieve both highly accurate short and highly accurate extended timing intervals exceeding a ratio of 200.

Further objects of the present invention are to provide a novel cycling timer which is accurate, which produces repeatable timing cycles, which is temperature stable and which does not require a specific orientation with respect to gravitational fields.

It is a still further object of the present invention to provide a novel cycling timer for an aircraft de-icer system which is reliable, accurate and capable of producing sufficient power output to operate the aircraft control mechanisms.

It is a still further object of the present invention to provide a novel apparatus for producing extended time intervals in which the energy discharge of a capacitor is timed in discrete periods to significantly prolong the timing capability of the capacitor network.

It is a still further object of the present invention to provide a novel apparatus for producing extended time intervals in which a capacitor discharge is initiated by the gating of a silicon controlled rectifier and terminated by the capacitor polarity.

It is a still further object of the present invention to provide a novel cycling timer in which one of the cycles produces an extended time interval which is largely determined by the time constant of a resistive capacitive network and the product of unijunction transistor oscillator timing network as modified by the gating "memory" of a silicon controlled rectifier.

The foregoing and other additional objects and advantages of the present invention will appear more fully hereafter from a consideration of the detailed description which follows, taken together with the accompanying drawing wherein an embodiment of the present invention is illustrated diagrammatically. It is to be expressly understood that the drawing is for the purpose of illustration and description, and is not to be construed as defining the limits of the invention.

Turning now to the drawing, numeral 10 shows generally a cycling timer apparatus having first and second timing networks 12 and 14 respectively, outlined with dashed lines, and a switch 16 shown as a double pole-double throw switch having a switching lever 16e which alternately contacts switch points 16a and 16b and switch lever 16f which alternately contacts switch points 16c and 16d. The switch 16 is controlled by a switch actuator or coil 24 which has a mechanical connection 24a which operates the switch levers 16e and 16f. It can be understood that the switch 16 could be comprised of a plurality of transistors or other solid state switching devices in which case the switch actuator member 24 would be one or more resistor members. Such a substitution can be made by those skilled in the art without the exercise of invention.

The switch member controls the energization of a load or controlled device 18 shown as a coil. The coil 18 might be the solenoid actuator of de-icer valves or any other controlled device. The load 18 need not be inductive, and the coil is shown as illustrative only. The switch 16 interconnects the load 18, a positive terminal 22a and a ground terminal 22b. Either positive or ground terminal may be considered an electrical source such as an aircraft battery, a rectified A.C. generator voltage or some other source.

The first timing network 12 is connected by lead wire 66 to switch contact point 16b, and the second timing network 14 is connected by lead wire 68 to switch contact point 16a. The first timing network 12 has resistor members 26 and 30 connected to lead wire 66 leading to emitter lead 25e and base one lead $25b_1$ of the first unijunction transistor member 25. Base two lead $25b_2$ of the first unijunction transistor member is connected to a ground terminal 22c through resistor 31. A capacitor member 28 interconnects resistor member 26 to ground terminal 22c. A resistor member 34 interconnects the base two lead $25b_2$ of the first unijunction transistor member 25 to the control electrode or gate lead 36g of the first silicon controlled rectifier member 36. The first silicon controlled rectifier member 36 has it cathode lead 36c connected to the anode 38a of a first Zener diode mmeber 38 which has its cathode 38c connected to ground terminal 22c.

The second timing network 14 has a second unijunction transistor member 42 having an emitter 42e, base one $42b_1$ and a base two $42b_2$. The base one $42b_1$, of the unijunction transistor 42, is interconnected to the switch member 16 by resistor member 48 through lead wire 68. The emitter 42e of the second unijunction transistor member 42 is connected to the switch member through resistor member 44 and lead wire 68. A capacitor member 46 interconnects the emitter 42e of the second unijunction transistor member 42 to a ground terminal 22d. A resistor member 50 connects the base two $42b_2$ of the second unijunction transistor member 42 to terminal 22d. A second silicon controlled rectifier 54 has its control electrode or gate 54g connected to base $42b_2$ of the second unijunction transistor member 42 through resistor 52. The cathode 54c of the second silicon controlled rectifier is connected to ground terminal 22d.

An energy storage element 20, which is in the preferred embodiment of the invention a capacitor, interconnects the anodes 36a and 54a of the first and second silicon controlled rectifier members 36 and 54 respectively. The anode 36a of the first silicon controlled rectifier member 36 is connected to switch lever 16e through a resistor member 40 and the actuating member 24 and lead wire 70. A primary switch member 61 controls the energization of the switch member 16 and the cycling timer apparatus. Thus, whenever switch 61 is closed, the switch lever 16e is connected to the source of electrical energy. Switch contact points 16b and 16d are connected together by lead wire 64. Switch contact point 16c is interconnected to terminal 22b of the source of electdical energy through resistor 63. Switch levers 16e and 16f are interconnected by a capacitor member 62.

A Zener diode member 56 having an anode 56a and a cathode 56c has its anode 56a connected to the anode 54a of the second silicon controlled rectifier 56, and its cathode 54c connected to resistor 58 which is in turn connected to ground terminal 22d.

When switch 61 is closed, switch 16 which has a normal position in which levers 16e and 16f are in contact with switch points 16b and 16d respectively is energized. This normal position may be achieved by resiliently biasing actuator linkage 24a. Power is then supplied through contact point 16b to the first timing network 12 and through contact point 16d to the controlled device 18. Enough power is supplied through actuating member 24 when the first and second silicon controlled rectifier members 36 and 54 are not in a conducting mode to substantially fully charge capacitor 20 through Zener diode 56 and resistor member 58, but insufficient power and current is available to actuate actuating member 24, thereby allowing load member 18 to remain energized which is the desired operation.

When the first timing network 12 unijunction transistor 25 reaches conduction, it gates silicon-controlled rectifier 36 and causes it to conduct from its anode 36a to its cathode 36c. Conduction by silicon controlled rectifier 36 requires during this period of operation current flow through actuating member 24 at a level sufficient to actuate switch 16. Switch contact points 16a and 16c are thus energized and switch contact points 16b and 16d are de-energized. The first timing network 12 and the controlled device 18 are thereby de-energized. The stored energy in load 18 is dissipated in capacitor 62, resistor 63 and ground terminal 22e which protect the switch 16 from damage caused by electrical arcing.

Energization of contact points 16a and 16c supplies power to the second timing network 14. The second timing network is, as is the first timing network 12, a free running oscillator, having a second unijunction transistor member 42 which can gate or cause the conduction of a second silicon controlled rectifier member 54 at a predetermined rate or frequency. In the known unijunction transistor-silicon controlled rectifier circuits, the unijunction transistor turns the silicon controlled rectifier "on" and the silicon controlled rectifier remains in the conducting mode. In the present invention, the charge on capacitor 20 places a reverse bias on the anode 54a of the silicon controlled rectifier 54 so that it is in the conduction state only during the time duration of the electrical pulse supplied to the gate 54g by the unijunction transistor member 42 and the "memory" or turn-off time of the silicon controlled rectifier member 54. During the time the conduction of second silicon controlled rectifier member 54 the negatively charged portion of the capacitor is connected to ground so that, the capacitor member 20 may discharge a portion of its stored energy through the first silicon controlled rectifier 36 and Zener diode member 38. The first silicon controlled rectifier member 36 remains in a conducting mode even though the first timing network had been de-energized. The second timing network 14 will continue to cycle and cause the periodic conduction of the second silicon controlled rectifier member 54 thereby causing the incremental de-energization of the capacitor 20 at discrete time intervals controlled by the period of oscillation of the second timing network 14, the "memory" time of the silicon controlled rectifier and the valve of the capacitor 20 and the resistance through which it dissipates its stored energy.

When, during the discharge of capacitor 20, the voltage drop across the second silicon controlled rectifier member 54 and the capacitor member 20 becomes less than the voltage drop across the first silicon controlled rectifier member, and the Zener diode member 38, the Zener diode member 38 and the first silicon controlled rectifier are effectively "short circuited" by the low impedance of the capacitor 20 which begins to charge in the manner herein above described. This "short circuiting" of the first silicon controlled rectifier member 36 causes it to be returned to a non-conducting or "off" mode. Non-conduction of the first silicon controlled rectifier member 36 requires that actuating member 24 be de-activated since the charging current of capacitor is by choice insufficient to maintain relay coil 24 in its energized state. Switch 16 is thus de-activated; energy is re-supplied to the first timing network 12 and removed from the second timing network 14, and a second cycle has commenced.

The present invention is capable of establishing a 2.5 second "on" and a 10 minute "off" time for the controlled device 18 using capacitor smaller than 100 microfarads. The present invention is capable of achieving even longer "off" times than the present 200 to 1 ratio. The periods can be readily reversed as to "on" and "off" so that an extended "on" time and a short "off" can be provided. The time periods established by the present invention are accurate within $\frac{1}{10}$ of a percent in the time domain. Such accuracy over such long periods of time was not previously believed possible. Prior art devices relied only on the exponential decay of a capacitor charge of an inductor current which for long periods of time required relatively large capacitors or inductors and required operation in the not accurately predictable segment of the exponential decay.

The present invention is able to achieve its highly accurate "extended time period" by permitting the capacitor 20 to discharge only during the brief period the second silicon controlled rectifier is in a conducting mode thus extending significantly the time period of capacitor discharge. Extended time intervals of virtually any length can be achieved with the circuitry of the present invention with much smaller and lower cost electrical circuit elements than formerly believed possible. The present invention is more temperature stable and more accurate than known prior circuits.

It should be appreciated that the present invention can produce highly accurate, long or short dual time periods when comprised of the components so far described. If desired, a switch member 72 and a resistor member 60 are placed in parallel with the capacitor 20 and the switch member 72 are placed in the up position. This provides dual short time intervals of operation. The operation of this alternate capability of the circuit is basically as previously described, except that the capacitor 20 will charge only when the second silicon controlled rectifier 54 is in the conducting mode. Charging of the capacitor 20 will turn "off" the first silicon controlled rectifier 36. As capacitor 20 approaches the fully charged condition, it will turn "off" the second silicon controlled rectifier member 54. The actuating member 24 will be deactivated, returning the switch levers 16e and 16f into contact with switch points 16b and 16d. The first timing network 12 will be re-energized to turn "on" the first silicon controlled rectifier member 36 which will reactivate actuating member 24 to cause switch points 16a and 16c to be re-energized. Energization of switch points 16a and 16c supplies power to the second timing network 14. When capacitor 20 voltage is lower than the voltage across the first silicon controlled rectifier member 36, and the Zener diode member 38, the capacitor 20 will commence recharging, and a new cycle will begin.

It can be readily appreciated that the present invention achieves its stated objects. It should also be appreciated that the switch member 16 could be a mechanical rotating switch which would have a plurality of element values or members of resistor members 26, 30, 44 and 48 and capacitors 20, 28 and 46 associated therewith to alter the cycling times in accordance with a preselected schedule. If switch 61 is opened at any point of the cycle, the cycle stops at that point. Reclosing of switch 61 restarts the cycling timer at the beginning. The feature is desirable because the first cycle of the device is not dependent on the point of previous operation of the present invention. The present invention is capable of controlling relatively large currents which is important, if the controlled devices such as load 18 are to move or control large equipment.

Many cycling timers would require an amplifying device of some time to control the multi-ampere loads which the present invention is able to control without amplification.

We claim:

1. A cycling timer for connection to a source of electrical energy to control the time duration of a plurality of states of a controlled device comprising:

switch means having at least two operating states connected to the source of electrical energy and operative to connect the controlled device to, and disconnect the controlled device from, the source of electrical energy;

first and second timing network means connected to, and disconnected from, the source of electrical energy by the switch means;

each of said first and second timing network means being connected to the source of electrical energy to the exclusion of the other of said first and second timing network means;

energy storage means interconnecting said first and second timing network means;

switch actuating means interconnecting said source of electrical energy and said energy storage means operative to permit said energy storage means to accumulate energy while said first timing network means are connected to the source of electrical energy, and actuable to control said switch means;

said first timing network means operative to control said switch actuating means thereby substantially determining the time duration of one of the states of the controlled device and providing a portion of the discharge path for said accumulated energy when said first timing network means are disconnected from said source of electrical energy; and said second timing network means operative to substantially determine the time duration of another of the states of the controlled device by intermittently providing the remainder of the discharge path for said accumulated energy.

2. The cycling timer as claimed in claim 1 wherein said timing network means comprise:

first and second oscillator means alternately connected to the source of electrical energy by said switching means; and first and second solid state switch members connected by their control electrodes to the outputs of said first and second oscillators.

3. The apparatus as claimed in claim 1 wherein:
the energy storage means comprises a capacitor member.

4. The apparatus as claimed in claim 2 wherein:
the first and second timing network means solid state switch members are first and second silicon controlled rectifier members.

5. The cycling timer as claimed in claim 4 wherein:
said first silicon controlled rectifier is operative upon conduction to activate said switch actuating means; and said first and second silicon controlled rectifier members are operative upon simultaneous conduction to establish a discharge path for said energy storage means.

6. The apparatus as claimed in claim 4 wherein:
each of said first and second timing network means has a unijunction transistor member for respectively gating each of said first and second silicon controlled rectifier members.

7. The apparatus as claimed in claim 6 wherein:
said capacitor means interconnects the anodes of said first and second silicon controlled rectifier members;

the cathode of said silicon controlled rectifier member is connected to the source of the electrical potential; and a diode member interconnects the cathode of said first silicon controlled rectifier member to the source of the electrical potential.

8. The apparatus as claimed in claim 7 wherein:
a diode member and a resistor member are in electrically parallel relationship with the second silicon controlled rectifier member.

9. The apparatus as claimed in claim 7 wherein:
a resistor member is in electrically parallel relationship with the capacitor member.

10. A cycling timer for connection to a source of electrical energy, the timer determining the time duration of a plurality of states for a controlled device comprising:

electrical switch means for connection to the source of electrical energy and to the controlled device for making and breaking a plurality of electrical circuits substantially simultaneously;

first and second timing network means alternately connected by the switch means to the source of electrical energy, the first and second timing network means respectively having first and second silicon controlled rectifier members, first and second unijunction transistor members, and first and second dissipative electrical energy storage means, the respective energy storage means causing the respective conduction of the unijunction transistor members and the respective gating of the silicon controlled rectifier members;

actuating means for controlling the operation of the switch means disposed in electrical series relationship between the switch means and the anode of the first silicon controlled rectifier member;

capacitive means interconnecting the anodes of the first and second silicon rectifier members; and said capacitive means are operative to accumulate an electrical charge while said first timing network is connected to the source of electrical energy prior to conduction of said first silicon controlled rectifier and operative to discharge said accumulated charge when said second unijunction transistor member is in conduction.

11. The apparatus as claimed in claim 10 wherein:
the first silicon controlled rectifier cathode having a more electrically reactive connection to the source of electrical energy than the second silicon controlled rectifier cathode.

12. The apparatus as claimed in claim 10 wherein:
a first Zener diode member interconnects the first silicon controlled rectifier member to the source of electrical energy.

13. The apparatus as claimed in claim 12 wherein:
a second Zener diode member and a resistor member are disposed in electrically parallel relationship with said second silicon controlled rectifier member.

14. The apparatus as claimed in claim 12 wherein:
a resistor member disposed in electircally parallel relationship with said capacity member.

References Cited

UNITED STATES PATENTS

| | | | |
|---|---|---|---|
| 3,182,227 | 5/1965 | Brittain et al. | 317—142 |
| 3,188,502 | 6/1965 | Skoog et al. | 307—132 |
| 3,325,657 | 6/1967 | Corey | 307—132 |

LEE T. HIX, Primary Examiner

U.S. Cl. X.R.

307—132, 293, 305; 317—148